United States Patent [19]

Pendergraft

[11] Patent Number: 5,015,460

[45] Date of Patent: May 14, 1991

[54] CONDENSER-REACTOR SWITCHING UNITS FOR EXTENDED CLAUS PROCESS

[75] Inventor: Paul T. Pendergraft, Houston, Tex.

[73] Assignee: Amoco Corporation, Chicago, Ill.

[21] Appl. No.: 443,789

[22] Filed: Nov. 30, 1989

[51] Int. Cl.⁵ .................. C01B 17/04; B01J 8/04; B01J 12/02

[52] U.S. Cl. .................. 423/574 R; 422/115; 422/116; 422/171; 422/190

[58] Field of Search .................. 423/574 R; 422/114, 422/115, 116, 171, 190

[56] References Cited

U.S. PATENT DOCUMENTS

| Re. 28,830 | 5/1976 | Hunt, Jr. et al. | 423/574 R |
|---|---|---|---|
| 2,767,062 | 10/1956 | Duecker | 423/576 |
| 3,702,884 | 11/1972 | Hunt, Jr. et al. | 423/222 |
| 3,749,762 | 7/1973 | Montgomery | 423/574 R |
| 3,758,676 | 9/1973 | Goddin, Jr. et al. | 423/574 R |
| 4,029,753 | 6/1977 | Beavon | 423/574 R |
| 4,035,474 | 7/1977 | Kunkel et al. | 423/574 R |
| 4,124,696 | 11/1978 | Kunkel | 423/574 R |
| 4,180,554 | 12/1979 | Goddin, Jr. et al. | 423/574 R |
| 4,315,904 | 2/1982 | Lell et al. | 423/574 R |
| 4,391,790 | 7/1983 | Palm et al. | 423/574 R |
| 4,391,791 | 7/1983 | Palm et al. | 423/574 R |
| 4,400,369 | 8/1983 | Palm | 423/574 R |
| 4,426,369 | 1/1984 | Palm | 423/574 R |
| 4,430,317 | 7/1984 | Reed et al. | 423/574 R |
| 4,462,977 | 7/1984 | Reed | 423/574 R |
| 4,473,541 | 9/1984 | Palm | 423/574 R |
| 4,482,532 | 11/1984 | Cabanaw | 423/574 R |
| 4,483,844 | 11/1984 | Cabanaw | 423/574 R |
| 4,487,754 | 12/1984 | Reed | 423/574 R |
| 4,507,275 | 3/1985 | Reed | 423/574 R |
| 4,508,698 | 4/1985 | Reed | 423/574 R |
| 4,526,590 | 7/1985 | Palm et al. | 55/27 |
| 4,601,330 | 7/1986 | Palm et al. | 165/95 |
| 4,643,888 | 2/1987 | Palm | 423/574 R |
| 4,684,514 | 8/1987 | Chen | 423/574 R |
| 4,756,900 | 7/1988 | Pendergraft et al. | 423/574 R |

FOREIGN PATENT DOCUMENTS

| 938087 | 12/1973 | Canada | 423/574 R |
|---|---|---|---|
| 2708012 | 9/1977 | Fed. Rep. of Germany | 423/574 R |

OTHER PUBLICATIONS

Delta Engineering Corp., "Delta is . . . Sulfur Recovery".

A. B. Coady, "MCRC Process for Improving Claus Plant Recovery", 6/9/76.

A. B. Coady and R. E. Heigold, "The MCRC Sub-Dewpoint Claus Process", 9/14/83.

R. E. Heigold and D. E. Berkeley, "Pine River Uses Four-Converter MCRC", 9/12/83.

Enstar Engineering Co., "MCRC Sulfur Recovery Process", 2/26/85.

R. E. Heigold and D. E. Berkeley, "The MCRC Sub-Dewpoint Sulphur Recovery Process", 3/83.

Primary Examiner—Jeffrey E. Russel

[57] ABSTRACT

A reactor unit for use in extended Claus process plants comprising three or more reactor units, each alternating between operation under high temperature Claus and cold bed adsorption conditions, comprises a sulfur condenser upstream of an associated downstream reactor which are rotated as a unit through operations in the plant. This reduces the number of condensers required. In a further aspect, a potential surge in the plant low pressure steam system is eliminated in comparison with previous similar extended Claus plants.

10 Claims, 3 Drawing Sheets

FIG. 1 – Prior Art

CONDENSER-REACTOR SWITCHING UNITS FOR EXTENDED CLAUS PROCESS

FIELD OF THE INVENTION

The invention relates to extended Claus sulfur recovery plants and processes of the type having at least three reactors each periodically operated alternately under high temperature Claus and under CBA conditions and particularly to reactor switching units for such plants. In another particular aspect, the invention relates to such plants and processes which require fewer sulfur condensers than a prior art design. In another particular aspect, the invention relates to such plants and processes which prevent a high pressure to low pressure transition in a condenser from affecting emissions from the sulfur plant.

SETTING OF THE INVENTION

An extended Claus sulfur recovery plant comprises one or more catalytic reactors operated under high temperature Claus conditions in series with one or more catalytic reactors operated under cold bed adsorption (CBA) conditions. Under high temperature Claus conditions, sulfur formed in presence of Claus catalyst is continuously removed from the reactor in vapor phase and condensed in a sulfur condenser. Under CBA conditions, most sulfur formed is deposited and accumulated on the Claus catalyst. The sulfur is periodically removed during regeneration by effective high temperature gas flowing through the reactor and vaporizing sulfur which is withdrawn in vapor phase from the reactor and condensed in a sulfur condenser. High temperature Claus operation and regeneration can occur concurrently.

Besides condensing sulfur, shell-and-tube indirect heat exchangers used as sulfur condensers produce useful steam. In such shell-and-tube exchangers, boiler feed water in the shell side is converted to steam while in the tube side process gas containing sulfur vapor is cooled and sulfur is condensed and removed. For purposes of discussion, steam production on the shell side and gas cooling and sulfur condensation on the tube side is assumed. However, steam production on the tube side and process gas cooling and sulfur condensation on the shell side can also be used.

Where the process gas after cooling is above about 300° F., high pressure (for example, 60 psig) steam can be produced. When the process gas after cooling is below about 300° F. down to about 260° F., only low pressure steam (for example, 15 psig) can be produced.

High pressure steam has many uses in plants and represents significant economic advantage relative to low pressure steam which has fewer applications. It is desirable to maximize high pressure steam production and to produce low pressure steam only when high pressure steam cannot be produced consistent with efficient and cost effective design and operation of the sulfur plant.

In extended Claus processes, sulfur condensers cooling gas for introduction in to CBA reactors typically operated at temperatures less than 300° F. generally produce only low pressure steam whereas sulfur condensers feeding high temperature Claus reactors or "warm" CBA reactors can be used to produce high pressure steam. When a reactor is alternated between "warm" and "cool" CBA and high temperature Claus operations concurrent with regenerator, a condenser feeding that reactor sometimes produces low pressure steam and sometimes produces high pressure steam.

In the type of extended Claus sulfur recovery plant in which three or more reactors are each periodically alternated between CBA and high temperature Claus conditions, conventional plant design associates a sulfur condenser with a reactor and rotates the reactor/condenser pair as a unit. Such a plant is shown in FIG. 1—PRIOR ART. TABLE A identifies reference numbers in FIG. 1 for easy identification.

TABLE A

| Symbol | Refers To |
|---|---|
| FURN/WHB | Claus furnace (FURN) with waste heat boiler (WHB) |
| $C_F$ | Furnace sulfur condenser |
| $V_a$ | WHB bypass reheat valve |
| $R_v$ | Claus reactor (dedicated to high temperature Claus operation) |
| $C_v$ | Claus reactor condenser |
| $V_b$ | Claus reactor condenser bypass reheat valve |
| A | Claus/CBA Reactor Unit A |
| B | Claus/CBA Reactor Unit B |
| C | Claus/CBA Reactor Unit C |
| 1,1' | Process gas supply to reactor from unit Cv or another reactor or reactor unit |
| 2 | Alternate process gas supply to reactor unit from another reactor unit |
| 3 | Reactor effluent line |
| 4 | Condenser effluent line |
| 5 | Effluent line to another reactor unit |
| 6 | Effluent line to tail gas (TG) disposal |
| 7 | High pressure steam (HPS) line |
| 8 | Low pressure steam (LPS) line |
| 9 | Liquid sulfur (S) outlet |
| 10 | Boiler feedwater (BFW) line |
| 13 | Timer/controller for valves |

TABLE 1

Switching Sequence and Steam Production in FIG. 1 Plant

| Mode[1] | Period[2] | Reactor Position[3] | | | Condenser Cv | | Condenser Ca | | Condenser Cb | | Condenser Cc | |
|---|---|---|---|---|---|---|---|---|---|---|---|---|
| | | Ra | Rb | Rc | From/To[4] | Steam Press. | From/To | Steam Press. | From/To | Steam Press. | From/To | Steam Press. |
| A | Claus 2 | 2 | 3 | 4 | Rv/Ra | 60 psi | Ra/Rb | 60 psi | Rb/Rc | 15 psi | Rc/TG | ** |
| A | Heat Up | 2 | 3 | 4 | Rv/Ra | Bypass | Ra/Rb | 60 psi | Rb/Rc | 15 psi | Rc/TG | ** |
| A | Plateau | 2 | 3 | 4 | Rv/Ra | Bypass | Ra/Rb | 60 psi | Rb/Rc | 15 psi | Rc/TG | ** |
| A | Heat Soak | 2 | 3 | 4 | Rv/Ra | Bypass | Ra/Rb | 60 psi | Rb/Rc | 15 psi | Rc/TG | ** |
| C | Precool | 3 | 4 | 2 | Rv/Rc | 15 psi | Ra/Rb | 15 psi | Rb/TG | ** | Rc/Ra | 15 psi |
| B | Claus 2 | 4 | 2 | 3 | Rv/Rb | 60 psi | Ra/TG | **[5] | Rb/Rc | 60 psi | Rc/Ra | 15 psi |
| B | Heat Up | 4 | 2 | 3 | Rv/Rb | Bypass | Ra/TG | ** | Rb/Rc | 60 psi | Rc/Ra | 15 psi |
| B | Plateau | 4 | 2 | 3 | Rv/Rb | Bypass | Ra/TG | ** | Rb/Rc | 60 psi | Rc/Ra | 15 psi |
| B | Heat Soak | 4 | 2 | 3 | Rv/Rb | Bypass | Ra/TG | ** | Rb/Rc | 60 psi | Rc/Ra | 15 psi |
| A | Precool | 2 | 3 | 4 | Rv/Ra | 15 psi | Ra/Rb | 15 psi | Rb/Rc | 15 psi | Rc/TG | ** |
| C | Claus 2 | 3 | 4 | 2 | Rv/Rc | 60 psi | Ra/Rb | 15 psi | Rb/TG | ** | Rc/Ra | 60 psi |
| C | Heat Up | 3 | 4 | 2 | Rv/Rc | Bypass | Ra/Rb | 15 psi | Rb/TG | ** | Rc/Ra | 60 psi |

TABLE 1-continued

| | | | | | Switching Sequence and Steam Production in FIG. 1 Plant | | | | | | | |
|---|---|---|---|---|---|---|---|---|---|---|---|---|
| | | Reactor Position[3] | | | Condenser Cv | | Condenser Ca | | Condenser Cb | | Condenser Cc | |
| Mode[1] | Period[2] | Ra | Rb | Rc | From/To[4] | Steam Press. | From/To | Steam Press. | From/To | Steam Press. | From/To | Steam Press. |
| C | Plateau | 3 | 4 | 2 | Rv/Rc | Bypass | Ra/Rb | 15 psi | Rb/TG | ** | Rc/Ra | 60 psi |
| C | Heat Soak | 3 | 4 | 2 | Rv/Rc | Bypass | Ra/Rb | 15 psi | Rb/TG | ** | Rc/Ra | 60 psi |
| B | Precool | 4 | 2 | 3 | Rv/Rb | 15 psi | Ra/TG | ** | Rb/Rc | 15 psi | Rc/Ra | 15 psi |
| A | Claus 2 | 2 | 3 | 4 | Rv/Ra | 60 psi | Ra/Rb | 60 psi | Rb/Rc | 15 psi | Rc/TG | ** |

[1]Each mode is characterized by specific flow sequence of process gas through reactors: A(Rv,Ra,Rb,Rc); B(Rv,Rc,Ra,Rb); C(Rv,Rb,Rc,Ra).
[2]Period describes operation of reactor in 2d position, except Precool occurs with freshly regenerated reactor in 3d position.
[3]Reactor position shows relative position in process stream of reactors Ra, Rb, Rc.
[4]Refers to source and destination of process gas in sulfur condenser.
[5]The steam in the shell of the condenser following the final CBA unit may be either 15 or 60 psig or in transition. There should be no sulfur condensation in this condenser, and if it is cooled more than necessary, more fuel will be required in the incinerator, but the differences are minimal.

TABLE 1 shows steam production and operation sequences for operation of the FIG. 1 plant. In the FIG. 1 plant, reactor $R_v$ is operated only as a first Claus reactor ("Claus 1") while reactors $R_a$, $R_b$, $R_c$ alternate between CBA operation and Claus operation. (Note: A reactor operated under high temperature Claus conditions may be referred to as a Claus reactor; likewise, a reactor operated under CBA conditions may be referred to as a CBA reactor—both Claus and CBA reactors catalyze the Claus reaction.) A reactor previously operated under CBA conditions which is being regenerated in the second position also operates as a second Claus reactor ("Claus 2"). CBA operation in the FIG. 1 plant occurs when a reactor is in the third and fourth positions. The third position reactor, after precooling to CBA operation conditions, is generally operated as a "warm" CBA (feed temperature above 280°-300° F. or more) and the fourth position reactor is generally operated as a "cool" CBA reactor (feed temperature about 250°-260° F.) for maximum recovery. Regeneration in the second position concurrently with Claus 2 operation includes heatup, plateau, and heat soak as is known to those skilled in the art (see U.S. Pat. Nos. 4,482,532 and 4,822,591 which are incorporated herein by reference). Precooling of a newly regenerated reactor is accomplished prior to returning a reactor to CBA operation. These steps individually are well known to those skilled in the art, and from FIG. 1 and TABLE 1 those skilled in the art will fully understand the sequence of operation.

One problem with the FIG. 1 plant is that in each of the modes of operation, there is always a condenser following the final CBA reactor. The gas leaving this reactor is normally cool (less than 280° F.) with a sulfur dewpoint depression of 50° to 80° F. Therefore, no sulfur will condense from this gas above the sulfur freezing point of about 235° F. Running this gas through a condenser just cools it with no benefit (except, perhaps, the small amount of steam which would be produced) and with the detriment that more fuel gas will be required in the incinerator to dispose of the cooled tail gas.

Another problem with the FIG. 1 plant arises from the practice of switching a condenser from a high pressure environment to a low pressure environment during certain portions of the operating cycle. This practice periodically overloads the low pressure steam delivery system resulting in an increase in emissions from the plant. This problem is discussed below in more detail.

A preferred precooling method for the FIG. 1 plant is a "backstep," such as precooling in mode C following regeneration in Mode A and prior to switching to Mode B, as this method does not preload with sulfur a freshly regenerated reactor before it is placed under CBA conditions.

The three condensers $C_a$, $C_b$, $C_c$ are tied to both low pressure steam (LPS) and high pressure steam (HPS) headers and produce either 15 psig or 60 psig steam at various times as shown in TABLE 1. This controls the effluent temperature from the condensers feeding CBA reactors during the different parts of the cycle to accomplish high sulfur recovery levels.

In TABLE 1, it can be seen that each of condensers $C_a$, $C_b$, and $C_c$ of FIG. 1 must undergo a high pressure to low pressure transition (indicated by brackets) at certain points in the cycle. At the time of the transition, each such condenser is full of hot water in equilibrium with high pressure steam at 60 psig. When the steam side of a condenser is switched to produce into the low pressure steam header, a large portion of this water tends to flash into steam which may overload the low pressure steam system. The pressure in the entire low pressure steam system increases until the excess steam can be condensed, sometimes taking several hours before the low pressure steam system returns to its normal operating pressure. This pressure surge causes the condensers connected together via the low pressure steam delivery system not to provide the cooling required for feeding process gas at an optimum temperature to the CBA reactors. Moreover, during the Precool period the reactor in the final position is the one which previously was operated as a "warm" CBA in the third position. The resulting relatively high temperature process gas being fed to the final CBA reactor results in an increase in emissions from the plant since Claus conversion decreases with increasing temperature. This increase in emissions due to relatively high temperature process gas feeding the warm final CBA reactor continues, often for several hours until the condenser approaches standard low pressure steam pressure long enough for the reactor in the final position to cool down to "cool" CBA operating conditions. Moreover, the cool temperature wave moving through the catalytic reactor is slow and broad, further delaying return to low emissions.

Thus, the problem addressed by this invention may be described as an emissions affecting pressure surge in the low pressure steam system of the FIG. 1 plant which results when a high pressure to low pressure transition occurs on the steam side of a sulfur condenser and causes the condenser to fail to provide adequate cooling of process gas to a final CBA reactor.

Another aspect of the problem is that the pressure surge in the low pressure line may upset processes using the low pressure steam.

Another aspect of the problem is that the surge in the low pressure steam system can cause other condensers connected to the low pressure steam system to fail to provide adequate cooling. Since the FIG. 1 plant otherwise provides highly satisfactory performance (the use of three alternating Claus/CBA reactors provides the highest sulfur recovery of known extended Claus plants), it is desirable to generally retain the plant's advantageous features, including production of high pressure and low pressure steam while solving this problem.

It is difficult to inexpensively solve this problem because of the large volume of steam generated by a sulfur condenser when the condenser is switched from operation at high pressure to operation at low pressure. An auxiliary condenser can be added downstream of each of condensers $C_a$, $C_b$, and $C_c$ to produce low pressure steam, with process gas flowing through each auxiliary condenser only when lower effluent temperatures are required, and at other times, the process gas bypassing the auxiliary condensers. Since condensers are large and more expensive than reactors this represents a costly solution to the problem.

An object of the invention is to provide an improved extended Claus plant and process of the type in which at least three Claus catalytic reactors are each periodically alternated between operation under high temperature Claus conditions and operation under cold bed adsorption conditions. A further object is such a process and plant which requires only four sulfur condensers instead of five as required by the FIG. 1 plant. A further object is such a process and plant in which periodic changes of sulfur condensers from operation as part of high pressure steam delivery system to operation as part of low pressure steam delivery system does not result in an increase in emissions from the sulfur plant; also, a process and plant which does not periodically upset the low pressure steam system and thereby cause upsets in other processes connected to this steam system. Other objects and advantages will be apparent from the following description and the claims.

SUMMARY OF THE INVENTION

FIG. 1 shows a prior art plant of the type in which at least three reactor/condenser units A, B, C are alternated between Claus and CBA conditions. The plant of FIG. 1 requires five sulfur condensers. This has been discovered to be the consequence of the prior art practice of rotating a reactor with the condenser following it through the cycle of operations in the FIG. 1 plant. Since the gas leaving a CBA reactor has a depressed dewpoint, and since the final reactor in the FIG. 1 plant is maintained at a minimal temperature with a minimal temperature rise across it, the dewpoint of the gas leaving the final reactor is well below the sulfur condenser effluent temperature and may even be below the sulfur solidification temperature. Therefore, sulfur present has already been removed by adsorption on catalyst in the final CBA reactor before the process gas enters the final condenser. Thus, no sulfur can be condensed in the condenser which follows the final CBA reactor and this condenser is unnecessary. This is illustrated in TABLE 1 by inspecting the entries represented by a double asterisk.

According to an aspect of the invention, a condenser preceding a reactor is rotated as a unit with the reactor as the unit is rotated through the cycle of operations. Compared with the prior art plant of FIG. 1 and TABLE 1, this saves the installation of one condenser along with, during operation, controlling that condenser to switch between LPS and HPS steam systems.

Thus, a sulfur recovery plant comprises three or more switching units each comprising a Claus catalytic reactor which is periodically alternated between operation under effective high temperature Claus conditions and operation under effective cold bed adsorption conditions. Each switching unit comprises an inlet sulfur condenser having a gas inlet and a gas outlet and a valve bypass line connecting the gas inlet and the gas outlet of the sulfur condenser. A Claus catalytic reactor in the unit has an inlet connected in flow communication with the gas outlet of the sulfur condenser and has a gas outlet. Inlet means, selectably by valve control connects the inlet of the sulfur condenser in flow communication with a gas outlet of a Claus catalytic reactor of at least another switching unit or with a source of process gas from which sulfur will be removed, optionally a high temperature Claus reactor. Outlet means, selectably by valve control, connects the gas outlet of the Claus catalytic reactor in flow communication with an inlet of one of at least one other switching unit and a tail gas disposal line. Each inlet sulfur condenser is thus effective for selectably by valve control receiving gas from outlet means of another switching unit and each switching unit comprising a respective inlet sulfur condenser and a Claus catalytic reactor downstream thereof is rotated as a unit in operation of the plant and alternates between operation under effective high temperature Claus conditions and under effective cold bed adsorption conditions.

In accordance with a further aspect of the invention, a high pressure to low pressure transition in the plant shown in FIG. 1 is prevented from causing an increase in emissions in the invented plant. The invented plant and process are provided with means for placing a sulfur condenser undergoing a high pressure to low pressure transition in a position feeding a reactor not requiring cold process feed such that the pressure transition can be accomplished over a period of time effective for not affecting cooling effectiveness of other condensers or steam users connected to low pressure system.

DETAILED DESCRIPTION OF THE INVENTION

Figure 1:
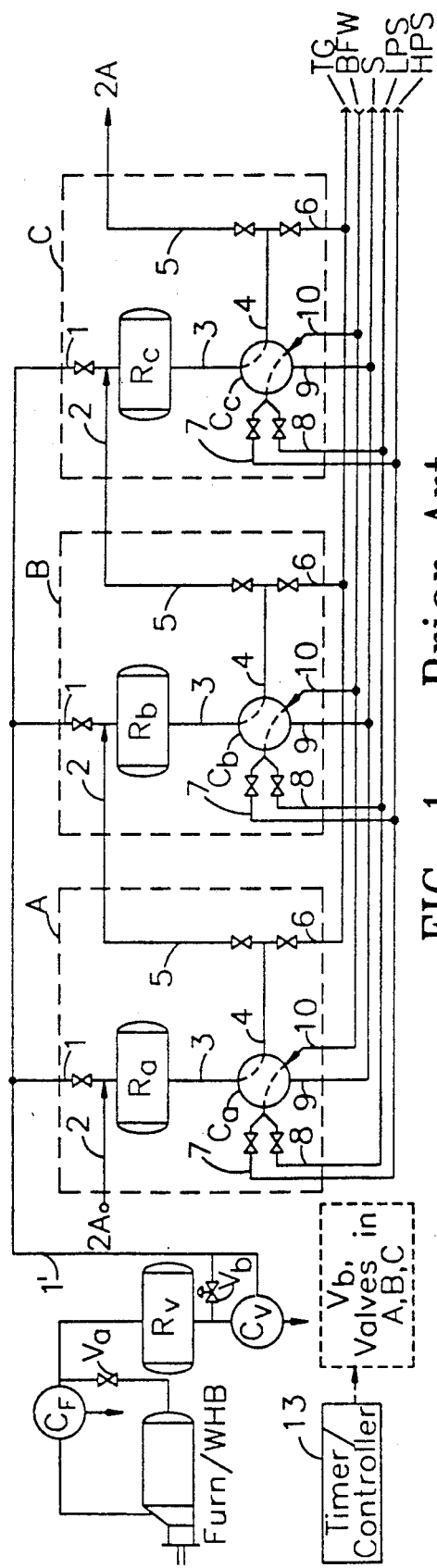
FIG. 1 illustrates an extended Claus process and plant in which at least three Claus catalytic reactors are alternately periodically operated under high temperature Claus conditions and under cold bed adsorption conditions.

Reference numerals for FIG. 2 correspond to those for FIG. 1 (including number 4' which like reference numeral 4 refers to a condenser effluent line) except for reference numeral 11 introduced for the first time below in the detailed description of FIG. 2. Reference numerals for FIG. 3 correspond to those for FIGS. 1 and 2.

Figure 2:
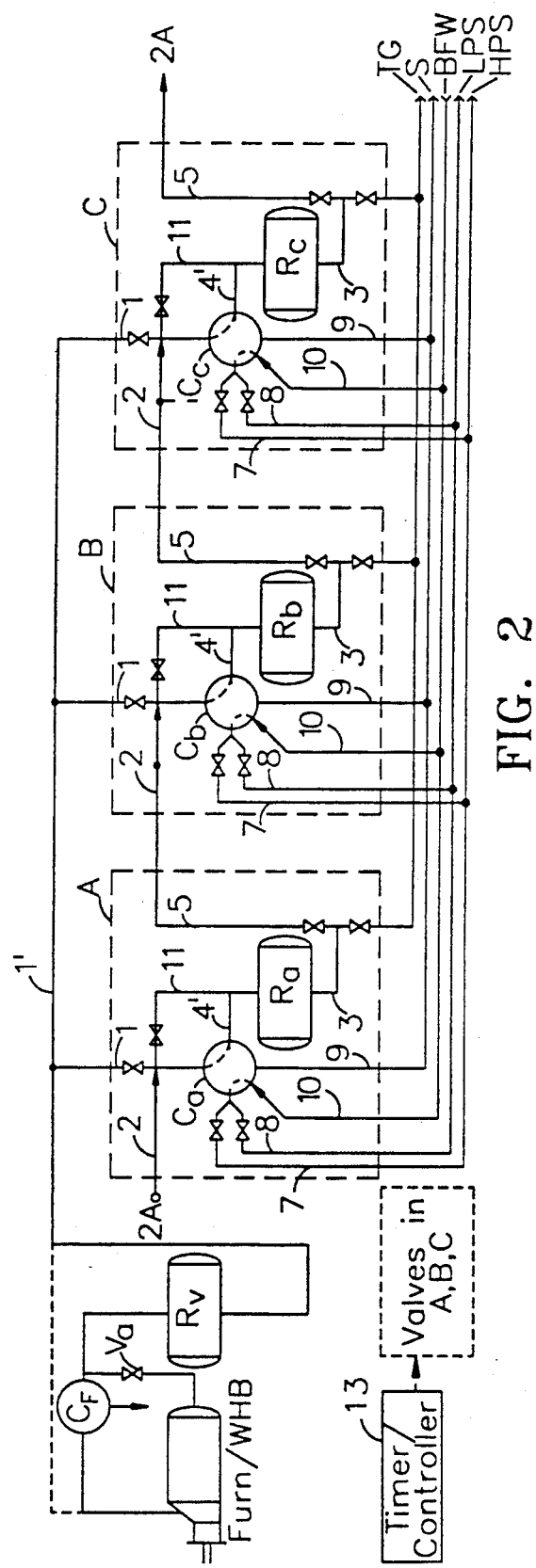
FIG. 2 illustrates an improved plant and process in accordance with the invention which eliminates need for one sulfur condenser of FIG. 1.

Referring now to FIG. 2, it can be seen that in comparison with the plant of FIG. 1, each switching unit A, B, C has an inlet sulfur condenser $C_a$, $C_b$, $C_c$ respectively associated therewith which is upstream of the respective catalytic reactor $R_a$, $R_b$, $R_c$ and that the condenser preceding a reactor is rotated with the reactor through the sequence of operations.

ing the reactor to the final position as overall sulfur recovery is largely a function of the temperature of that portion of catalyst within the final reactor in which Claus reaction occurs. During Precool, therefore, the hot newly regenerated catalyst is placed in the third position for a limited period of time for cooling. At the same time, the "warm" CBA reactor which had been in

TABLE 2

| | | \multicolumn{3}{c}{Switching Sequence and Steam Production in FIG. 2 Plant} | | | | | | |
| --- | --- | --- | --- | --- | --- | --- | --- | --- | --- | --- |
| | | Reactor Position[3] | | | Condenser Ca | | Condenser Cb | | Condenser Cc | |
| Mode[1] | Period[2] | Ra | Rb | Rc | From/To[4] | Steam Press. | From/To | Steam Press. | From/To | Steam Press. |
| A | Claus 2 | 2 | 3 | 4 | Rv/Ra | 60 psi | Ra/Rb | 60 psi | Rb/Rc | 15 psi |
| A | Heat Up | 2 | 3 | 4 | Rv/Ra | Bypass | Ra/Rb | 60 psi | Rb/Rc | 15 psi |
| A | Plateau | 2 | 3 | 4 | Rv/Ra | Bypass | Ra/Rb | 60 psi | Rb/Rc | 15 psi |
| A | Heat Soak | 2 | 3 | 4 | Rv/Ra | Bypass | Ra/Rb | 60 psi | Rb/Rc | 15 psi |
| C | Precool | 3 | 4 | 2 | Rc/Ra | 15 psi | Ra/Rb | 15 psi | Rv/Rc | 15 psi |
| B | Claus 2 | 4 | 2 | 3 | Rc/Ra | 15 psi | Rv/Rb | 60 psi | Rb/Rc | 60 psi |
| B | Heat Up | 4 | 2 | 3 | Rc/Ra | 15 psi | Rv/Rb | Bypass | Rb/Rc | 60 psi |
| B | Plateau | 4 | 2 | 3 | Rc/Ra | 15 psi | Rv/Rb | Bypass | Rb/Rc | 60 psi |
| B | Heat Soak | 4 | 2 | 3 | Rc/Ra | 15 psi | Ra/Rb | Bypass | Rb/Rc | 60 psi |
| A | Precool | 2 | 3 | 4 | Rv/Ra | 15 psi | Ra/Rb | 15 psi | Rb/Rc | 15 psi |
| C | Claus 2 | 3 | 4 | 2 | Rc/Ra | 60 psi | Ra/Rb | 15 psi | Rv/Rc | 60 psi |
| C | Heat Up | 3 | 4 | 2 | Rc/Ra | 60 psi | Ra/Rb | 15 psi | Rv/Rc | Bypass |
| C | Plateau | 3 | 4 | 2 | Rc/Ra | 60 psi | Ra/Rb | 15 psi | Rv/Rc | Bypass |
| C | Heat Soak | 3 | 4 | 2 | Rc/Ra | 60 psi | Ra/Rb | 15 psi | Rv/Rc | Bypass |
| B | Precool | 4 | 2 | 3 | Rc/Ra | 15 psi | Rv/Rb | 15 psi | Rb/Rc | 15 psi |
| A | Claus 2 | 2 | 3 | 4 | Rv/Ra | 60 psi | Ra/Rb | 60 psi | Rb/Rc | 15 psi |

[1]Each mode is characterized by specific flow sequence of process gas through reactors: A(Rv,Ra,Rb,Rc); B(Rv,Rc,Ra,Rb); C(Rv,Rb,Rc,Ra).
[2]Period describes operation of reactor in second position, except during Precooling in which the reactor in the third position is being cooled.
[3]Reactor position shows relative position in process stream of reactors Ra, Rb, Rc.
[4]Refers to source and destination of process gas in sulfur condenser.

Each inlet sulfur condenser is adapted with a valved bypass line 11 so as to provide bypass reheat gas for gas being fed to the reactor under Claus 2 operation, and correspondingly valve $V_b$ has been eliminated. Also, only four sulfur condensers are required since a condenser no longer occurs downstream of a final catalytic reactor in any of the modes of operation. Thus, the addition of two additional valved bypass lines and a new configuration of pipes and vessels has permitted the elimination of a sulfur condenser. Since a sulfur condenser is often physically large and more expensive than a catalytic reactor, substantial savings results.

Referring now to TABLE 2, TABLE 2 illustrates operation sequence and steam production from the FIG. 2 plant. As can be seen by comparing TABLE 1 and TABLE 2, the entries indicated in TABLE 1 by a double asterisk have been eliminated from the operation of the plant in accordance with FIG. 2 and TABLE 2. The steam production from the FIG. 2 plant, however, is substantially the same as steam production in the FIG. 1 plant (except that steam production from tail gas has been eliminated).

However, even though the FIG. 2 plant eliminates the need for one sulfur condenser relative to the FIG. 1 plant, it does not eliminate the emissions affecting pressure surge occurring at points in the cycle. This can be seen from the following discussion.

In the FIG. 1 plant, at the end of the Heat Soak Period the reactor in the second position is hot and fully regenerated, the reactor in the third position is on adsorption as a "warm" CBA reactor (feed temperature 280°–300° F. or warmer), and the reactor in the final position is on adsorption as a "cool" CBA reactor (feed temperature 260°–280° F). The hot Claus catalyst in the second position reactor must be cooled prior to switchthe third position is switched to the final position, and the cool CBA reactor which had been in the final position is switched to the second position (for example, Mode C). High emissions will result in this period if the warm reactor in the final position is maintained warm. It must be cooled to "cool" CBA operating conditions to keep the sulfur emissions at a minimum. During Precool, however, the condenser feeding the reactor in the final position is the one which was making high pressure steam during the previous Heat Soak period when it fed gas to the same reactor in the third ("warm" CBA) position. To keep emissions at a minimum, at the beginning of the Precool period, this condenser must very quickly be switched to low pressure steam. Prior to switching, the hot water in this condenser is in equilibrium with steam at the higher pressure. Reducing the pressure in this condenser causes a significant fraction of this water to flash to steam at the lower pressure in order to maintain the thermodynamic equilibrium. The amount of steam thus produced is nearly independent of the rate at which the pressure in the vessel is reduced. If the condenser is suddenly connected to the low pressure steam header, the total amount of steam that would be produced from the hot water will be produced very quickly, and the steam rate produced into the low pressure steam header will be very large. In fact, it may well be so large that the users of low pressure steam on this header cannot use the steam fast enough and the pressure within the header will increase. A new thermodynamic equilibrium will be reached as the switch is made from an isolated hot high pressure condenser and a low pressure steam header to a combined system with the condenser connected to the steam header. A higher pressure in the low pressure steam header means the temperature of the steam within it will also increase. This means that the condenser being switched and the other condensers producing steam into this header will do a less efficient job of cooling and those pieces of equipment which use the low pressure steam will suddenly receive a hotter steam which may result in upsets of the control system. A solution would be to very slowly bleed pressure from the condenser being switched from high pressure to low pressure operation into the low pressure steam header at such a rate that the amount of additional steam going into it from the reduction of the pressure on the hot water is insufficient to increase the pressure within the steam header. However, if this is done for the FIG. 1 plant, the gas feeding the final CBA reactor is too warm and a period of high sulfur emissions results.

Referring now to FIG. 2, it can be seen that the FIG. 2 plant is constrained by its piping and is unable when in mode A to interchange, for example, units A and B while keeping unit C in final position; or when in mode B, is unable to interchange units B and C while keeping unit A in final position; or when in mode C, is unable to interchange units A and C while keeping unit B in final position.

The consequences of this can be illustrated by considering, as in FIG. 2, a Claus reactor $R_v$ followed by Claus/CBA reactors, $R_a$, $R_b$, $R_c$ which are each preceded by a condenser $C_a$, $C_b$, and $C_c$ and which are piped so that each reactor and condenser ($C_a$ and $R_a$, $C_b$ and $R_b$, and $C_c$ and $R_c$) rotate as a unit in sequences illustrated by TABLE 2. During the heat soak period, the sequence is $R_v$, $C_a$ (bypassed), $R_a$, $C_b$ (60 psig), $R_b$, $C_c$ (15 psig), $R_c$. This allows $R_a$ to be heated for the heat soak period of regeneration, $C_b$ to make higher pressure steam, $R_b$ to be a CBA reactor operated slightly warmer than the final CBA reactor, and $C_c$ to cool a gas as much as possible for a higher recovery in final CBA reactor $R_c$.

When switching to the precool period, the sequence becomes $R_v$, $C_c$ (15 psig steam), $R_c$, $C_a$ (15 psig steam), $R_a$, $C_b$ (15 psig steam), $R_b$. Condenser $C_c$ should make 15 psig steam to keep temperatures low in $R_c$ which will cause more Claus reaction to occur and therefore less reaction and heat of reaction in the following CBA reactor $R_a$ which allows it to cool more quickly. Also, in the steps preceding Precool, condenser $C_c$ had been making 15 psig steam, so maintaining it at 15 psig is causes problem. Condenser $C_a$ produces 15 psig steam since it is furnishing the cool gas to do the cooling of $R_a$. A higher pressure of steam in the low pressure steam system resulting from connecting the shell side of $C_b$ into the LPS system would prevent the reactor $R_a$ from becoming as cool L and then in the next step, $R_a$ will be placed in the final position and the recovery of the process, which is a strong function of the temperature of the final adsorption reactor, will be affected. Condenser $C_b$ is now sending process gas to the reactor $R_b$ in the final position. In the previous step, this condenser produced 60 psig steam, and the reactor following it $R_b$ is therefore warmer than optimum. This reactor $R_b$ is now in the final position and must be further cooled to maintain a high sulfur recovery (as explained above). To do this, condenser $C_b$ must now produce 15 psig steam. Therefore, the need for a sudden reduction in a condenser steam pressure still exists in this configuration, and the corresponding pressure surge in the low pressure steam system will occur.

Thus, whereas the FIG. 2 plant eliminates the need for one of the sulfur condensers of the FIG. 1 plant, the FIG. 2 plant continues to have an emissions affecting surge in the low pressure steam system.

Figure 3:
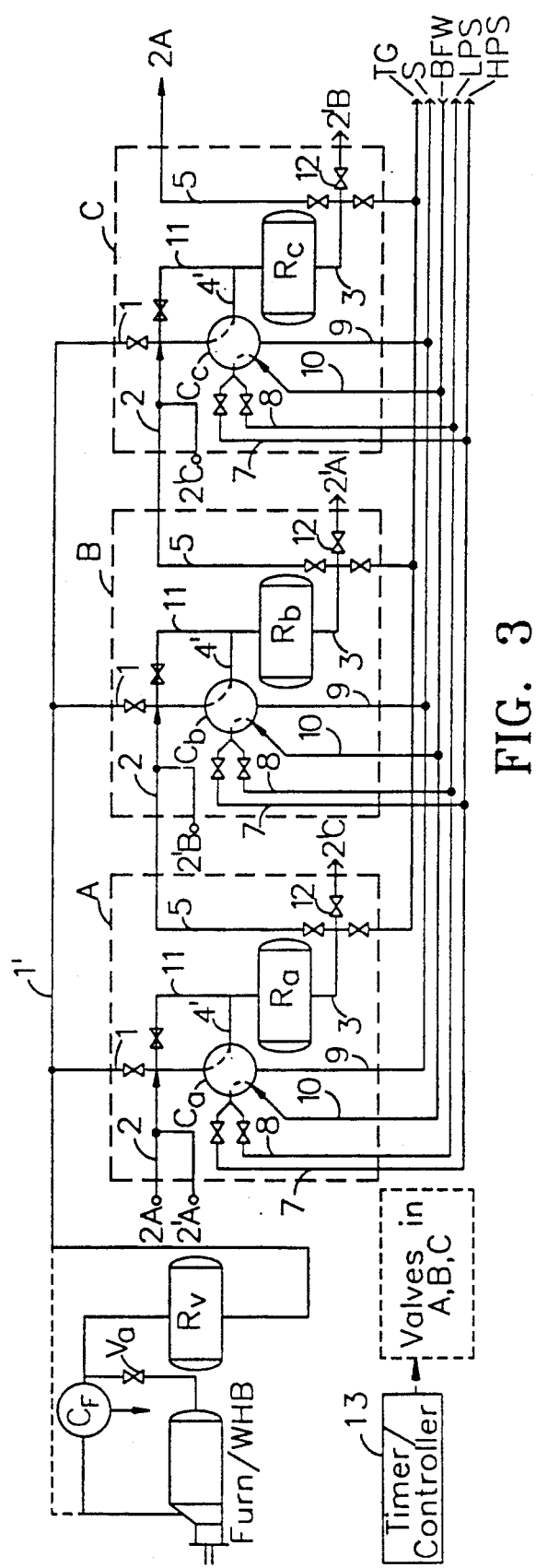
FIG. 3 illustrates an alternative embodiment of the plant of FIG. 2 which prevents a high pressure to low pressure transition in a sulfur condenser from causing a pressure surge in the low pressure steam delivery system which causes an increase in emissions from the plant.

However, by addition of valved lines 12 (connecting unit A to inlet of unit C, unit B to inlet of unit A, and unit C to inlet of unit B—see reference numerals 2'A, 2'B, 2'C indicating such connections) as shown on FIG. 3, reactor effluent from A can be fed to either of units B or C; from B can be fed to either of units A or C; and from C can be fed to either of units A or B, permitting operation in accordance with the invention.

TABLE 3

| | | Switching Sequence and Steam Production in FIG. 2 Plant | | | | | | | |
|---|---|---|---|---|---|---|---|---|---|
| | | Reactor Position[3] | | | Condenser Ca | | Condenser Cb | | Condenser Cc |
| Mode[1] | Period[2] | Ra | Rb | Rc | From/To[4] | Steam Press. | From/To Steam Press. | From/To Steam Press. | |
| A | Claus 2 | 2 | 3 | 4 | Rv/Ra | 60 psi | Ra/Rb 60 psi | Rb/Rc 15 psi | |
| A | Heat Up | 2 | 3 | 4 | Rv/Ra | Bypass | Ra/Rb 60 psi | Rb/Rc 15 psi | |
| A | Plateau | 2 | 3 | 4 | Rv/Ra | Bypass | Ra/Rb 60 psi | Rb/Rc 15 psi | |
| A | Heat Soak | 2 | 3 | 4 | Rv/Ra | Bypass | Ra/Rb 60 psi | Rb/Rc 15 psi | |
| | Precool | 3 | 2 | 4 | Rb/Ra | 15 psi | Rv/Rb 60 psi | Ra/Rc 15 psi | |
| B | Claus 2 | 4 | 2 | 3 | Rc/Ra | 15 psi | Rv/Rb 60 psi | Rb/Rc 60 psi | |
| B | Heat Up | 4 | 2 | 3 | Rc/Ra | 15 psi | Rv/Rb Bypass | Rb/Rc 60 psi | |
| B | Plateau | 4 | 2 | 3 | Rc/Ra | 15 psi | Rv/Rb Bypass | Rb/Rc 60 psi | |
| B | Heat Soak | 4 | 2 | 3 | Rc/Ra | 15 psi | Ra/Rb Bypass | Rb/Rc 60 psi | |
| | Precool | 4 | 3 | 2 | Rb/Ra | 15 psi | Rc/Rb 15 psi | Rv/Rc 60 psi | |
| C | Claus 2 | 3 | 4 | 2 | Rc/Ra | 60 psi | Ra/Rb 15 psi | Rv/Rc 60 psi | |
| C | Heat Up | 3 | 4 | 2 | Rc/Ra | 60 psi | Ra/Rb 15 psi | Rv/Rc Bypass | |
| C | Plateau | 3 | 4 | 2 | Rc/Ra | 60 psi | Ra/Rb 15 psi | Rv/Rc Bypass | |
| C | Heat Soak | 3 | 4 | 2 | Rc/Ra | 60 psi | Ra/Rb 15 psi | Rv/Rc Bypass | |
| | Precool | 2 | 4 | 3 | Rv/Ra | 60 psi | Rc/Rb 15 psi | Ra/Rc 15 psi | |
| A | Claus 2 | 2 | 3 | 4 | Rv/Ra | 60 psi | Ra/Rb 60 psi | Rb/Rc 15 psi | |

[1]Each mode is characterized by specific flow sequence of process gas through reactors: A(Rv,Ra,Rb,Rc); B(Rv,Rc,Ra,Rb); C(Rv,Rb,Rc,Ra).
[2]Period describes operation of reactor in second position, except during Precool in which the reactor in the third position is being cooled.
[3]Reactor position shows relative position in process stream of reactors Ra, Rb, Rc.
[4]Refers to source and destination of process gas in sulfur condenser.

Referring now to TABLE 3, it can be seen that the need for a sudden 60 to 15 psi transition has been eliminated. During the heat soak period (see Mode A), the sequence is $R_v$, $C_a$ (bypassed), $R_a$, $C_b$ (60 psig), $R_b$, $C_c$ (15 psig), $R_c$. This allows $R_a$ to be heated for the heat soak period of regeneration, $C_b$ to make higher pressure steam, $R_b$ to be a "warm" CBA reactor, and $C_c$ to cool a gas sufficiently for a "cool" CBA reactor $R_c$ for maximum recovery.

When switching to the precool period, the sequence becomes $R_v$, $C_b$ (60 psig), $R_b$, $C_a$ (15 psig), $R_a$, $C_c$ (15 psig), $R_c$.

While 15 psig steam could be produced in Condenser $C_b$ to provide a lower feed temperature to $R_b$ to maximize the Claus reaction in it, and thereby reduce the heat of reaction in cooling reactor $R_a$, it is not practical in this configuration. In the steps preceding Precool, condenser $C_b$ was making 60 psig steam as it was feeding the warm CBA reactor on adsorption. The reaction differential in reactor $R_a$ due to the difference in steam pressure in $C_b$ can be compensated for by slightly increasing the Precool time period. Condenser $C_a$ will make 15 psig steam to cool as quickly as possible the newly regenerated reactor $R_a$. In the steps prior to Precool, condenser $C_c$ was making 15 psig steam and feeding cool gas to cool final CBA reactor $R_c$. It can continue to do this during Precool and a cool reactor is maintained in the final position with a cool feed without the need for a sudden high pressure to low pressure transition to occur on the steam side of a condenser with the corresponding sulfur emission affecting pressure surge within the low pressure steam system.

With this invention, when the steam pressure in a condenser must be reduced (See Table 3, when a condenser is bypassed during the Heat-up, Plateau, and Heat Soak periods), a relatively long time lasting several periods (approximately 3 to 6 hours or more) is allowed for the high pressure in the condenser to be bled into the low steam pressure header without causing a sulfur emissions affection pressure surge within the low pressure steam header.

The invention is directed to solution of a particular problem in a particular type of extended Claus sulfur recovery plant The plant is one in which three reactor/condenser units are alternated between Claus and CBA operation, in which the steam production side of a condenser periodically undergoes a high pressure to low pressure transition, in which such transition affects recovery due to temperature effects within the low pressure steam system resulting in other condensers which are tied on shell side via a low pressure steam deliver system to the condenser undergoing the transition; and to a plant which produces both high pressure and low pressure steam. The invention in its various aspects eliminates the need for one of the sulfur condensers in a prior art design and permits retaining the capabilities of this plant in maximized production of high pressure and low pressure steam while avoiding increases in emissions which result from the high pressure to low pressure transition.

The invention has been described in terms of specific and preferred embodiments, but is not limited thereto but by the following claims interpreted according to applicable principles of law.

What is claimed is:

1. A sulfur recovery plant comprising:
   at least three units connectable for sequentially receiving process gas and for removing sulfur therefrom, each unit having a Claus catalytic reactor alternately periodically operated under effective high temperature Claus conditions and periodically operated under effective cold bed adsorption conditions, each unit comprising:
   a sulfur condenser having a gas inlet and a gas outlet;
   the gas inlet being connectable by valve control in flow communication for receiving effluent process gas from one of a Claus catalytic reactor of another unit and a source of process gas from which sulfur is to be removed, optionally from a high temperature Claus reactor;
   a valved bypass line connecting the gas inlet of the sulfur condenser with the gas outlet of the sulfur condenser;
   the Claus catalytic reactor of each unit having an inlet connected in flow communication with the gas outlet of the sulfur condenser and having an effluent outlet;
   outlet means for connecting the effluent outlet of the Claus catalytic reactor in flow communication with one of an inlet of at least one other unit and a tail gasline; and
   means for switching each inlet sulfur condenser as a unit with a downstream reactor during operation of the plant.

2. The sulfur recovery plant of claim 1 wherein the plant consists essentially of a Claus furnace and associated waste heat boiler, an optional furnace sulfur condenser, a first Claus high temperature catalytic reactor, three of said units, and piping and valves for connecting such for the recovery of sulfur.

3. The sulfur recovery plant of claim 1 further comprising:
   a first valved steam pressure line for receiving steam from sulfur condensers of switching units and for delivery such steam to a first pressure steam delivery system;
   a second valved steam pressure line for receiving steam from sulfur condensers of switching units and for delivering such steam to a second pressure steam delivery stem, the second pressure steam delivery system being at a lower pressure than the first pressure steam delivery system;
   means for controlling first and second steam pressure lines for causing a sulfur condenser of each unit periodically to undergo a first pressure to second pressure transition in the steam side thereof.

4. The plant of claim 3 further comprising:
   means for placing each condenser during such transition in a position where the transition can be accomplished at a rate effective for preventing such transition from causing an emissions affecting pressure surge in the second steam delivery system.

5. The plant of claim 1 wherein:
   outlet means effective for connecting effluent outlet of each unit's Claus catalytic reactor with inlet means of each other unit.

6. The plant of claim 1 wherein each unit comprises:
   inlet means comprising a first inlet line for connecting effluent outlet of Claus catalytic reactor of another unit in flow communication therewith and a second inlet line for connecting effluent outlet of Claus catalytic reactor of yet another unit in flow communication therewith; and
   outlet means comprising valved lines for connecting effluent outlet of Claus catalytic reactor thereof in flow communication with one of inlet means of another switching unit and inlet means of yet another switching unit and tail gas line.

7. In a sulfur recovery plant comprising
   at least three units connectable for sequentially processing gas for formation and removal of sulfur therefrom;

each unit having a Claus catalytic reactor periodically operated under effective high temperature Claus conditions and periodically operated under effective cold bed adsorption conditions;

each Claus catalytic reactor of each unit having an upstream sulfur condenser associated therewith for cooling process gas to said Claus catalytic reactor during operation under cold bed adsorption conditions;

each unit comprising a Claus catalytic reactor and associated upstream condenser being periodically alternated between operation under effective high temperature Claus conditions and effective cold bed adsorption conditions;

means for periodically connecting shell side of each inlet sulfur condenser to a first pressure steam delivery system and to a second pressure steam delivery system, the first pressure being greater than the second pressure.

8. The Plant of claim 7 further comprising:

means for causing the units to alternate in a sequence effective for periodically causing high pressure to low pressure transitions to occur in steam side of each unit's sulfur condenser; and means for placing each condenser during such transition in a position feeding a Claus catalytic reactor operated under high temperature Claus conditions where such transition can be accomplished at a rate effective for preventing such transition from causing an emissions affecting pressure surge in the second pressure steam delivery system.

9. In operation of an extended Claus process plant having at least first, second, and third Claus catalytic reactors with associated upstream first, second, and third condensers respectively associated therewith, each condenser being periodically switched from a first pressure steam delivery system to a second pressure steam delivery system, each reactor periodically being alternated between high temperature Claus operation and cold bed adsorption operation at a first temperature and cold bed adsorption at a second temperature lower than the first temperature, the steps comprising;

periodically switching each condenser from the first pressure steam delivery system to the second pressure steam delivery system causing each such condenser periodically to undergo a high pressure to low pressure transition, and during such transition period placing each condenser in a position where the transition can be accomplished at a rate effective for avoiding an emissions affecting pressure surge in the second pressure steam delivery system.

10. The method of claim 9 further comprising:

placing each condenser during the transition period in a position feeding process gas to the first of the three catalytic reactors through which process gas is passed in sequence;

bypassing process gas around the sulfur condenser feeding the first of the three catalytic reactors; and causing the high pressure to low pressure transition to occur during the period process gas is bypassed around the sulfur condenser feeding process gas to the first of the three catalytic reactors.

* * * * *

UNITED STATES PATENT AND TRADEMARK OFFICE
CERTIFICATE OF CORRECTION

PATENT NO. : 5,015,460

DATED : May 14, 1991

INVENTOR(S) : Paul T. Pendergraft

It is certified that error appears in the above--identified patent and that said Letters Patent is hereby corrected as shown below:

Column 2, line 16, "regenerator" should read --regeneration--; lines 25-26, "numbers" should read --numerals--; and line 46, "8" should read --8 8'--.

Table 1, the bracket connecting Mode A to C under the "From/To" column should be under the "Steam Press." column.

Table 2, the bracket connecting Mode A to C under the "From/To" column should be under the "Steam Press." column. Column 10, line 10, delete "L" after "cool".

Column 11, line 38, after "plant" insert --.--; and line 45, "deliver" should read --delivery--.

Claim 3, Column 12, line 31, "delivery" should read --delivering--; and line 36 "stem" should read --system--.

Signed and Sealed this

First Day of December, 1992

Attest:

DOUGLAS B. COMER

Attesting Officer

Acting Commissioner of Patents and Trademarks